(12) United States Patent
Sheen et al.

(10) Patent No.: US 12,405,368 B2
(45) Date of Patent: Sep. 2, 2025

(54) IMAGING SYSTEMS AND ASSOCIATED METHODS

(71) Applicant: Battelle Memorial Institute, Richland, WA (US)

(72) Inventors: David M. Sheen, Richland, WA (US); Richard Trevor Clark, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 333 days.

(21) Appl. No.: 17/959,890

(22) Filed: Oct. 4, 2022

(65) Prior Publication Data

US 2024/0118411 A1    Apr. 11, 2024

(51) Int. Cl.
| | |
|---|---|
| G01S 13/88 | (2006.01) |
| G01S 7/04 | (2006.01) |
| G01S 7/06 | (2006.01) |
| G01S 13/90 | (2006.01) |

(52) U.S. Cl.
CPC ............ *G01S 13/887* (2013.01); *G01S 7/043* (2013.01); *G01S 7/06* (2013.01); *G01S 13/9019* (2019.05)

(58) Field of Classification Search
CPC .......... G01S 13/887; G01S 7/043; G01S 7/06; G01S 13/9019
See application file for complete search history.

(56) References Cited

U.S. PATENT DOCUMENTS

| | | |
|---|---|---|
| 5,859,609 A | 1/1999 | Sheen et al. |
| 9,715,012 B2 | 1/2017 | Fernandes et al. |
| 11,520,069 B2 | 12/2022 | Jones et al. |

(Continued)

FOREIGN PATENT DOCUMENTS

WO    WO    9/2023
PCT/US2023/025178

OTHER PUBLICATIONS

Sheen et al., 'Efficient Image Reconstruction Method for a Millimeter-Wave Shoe Scanner', Proceedings of SPIE Passive and Active Millimeter-Wave Imaging, vol. 11411 2020, United States (Year: 2020).*

(Continued)

*Primary Examiner* — Vladimir Magloire
*Assistant Examiner* — Anna K. Gosling
(74) *Attorney, Agent, or Firm* — Wells St. John P.S.

(57) ABSTRACT

Imaging systems and associated methods are described. According to one aspect, an imaging system includes an antenna array having transmit and receive antennas, the transmit antennas emit electromagnetic energy from a plurality of different positions about a target imaging volume and the receive antennas receive reflections of the electromagnetic energy at the different positions, a transceiver configured to control the emission of the electromagnetic energy and to generate radar data that is indicative of the reflections of the electromagnetic energy received via the receive antennas; and processing circuitry configured to focus the radar data to provide first focused data in a first dimension, to focus the radar data in a second dimension to provide second focused data, and use the second focused data to focus the radar data in a third dimension to provide third focused data comprising an image of the target imaging volume.

31 Claims, 10 Drawing Sheets

(56) References Cited

U.S. PATENT DOCUMENTS

| | | | |
|---|---|---|---|
| 11,715,228 | B2 | 8/2023 | Sheen et al. |
| 2004/0090359 | A1 | 5/2004 | McMakin et al. |
| 2011/0050480 | A1 | 3/2011 | Kroning et al. |
| 2014/0320331 | A1 | 10/2014 | Fernandes et al. |
| 2020/0319331 | A1 | 10/2020 | Sheen et al. |
| 2020/0319332 | A1 | 10/2020 | Sheen et al. |
| 2020/0320731 | A1* | 10/2020 | Sheen ................. G06F 3/04815 |
| 2021/0325560 | A1 | 10/2021 | Jones et al. |
| 2023/0273310 | A1 | 8/2023 | Fernandes et al. |
| 2024/0013472 | A1 | 1/2024 | Clark et al. |
| 2024/0118411 | A1 | 4/2024 | Sheen et al. |

OTHER PUBLICATIONS

Clark et al., U.S. Appl. No. 18/133,749, filed Apr. 12, 2023, titled "Imaging Systems and Imaging Methods", 47 pages.

Hantscher et al., "Security Pre-Screening of Moving Persons Using a Rotating Multichannel W-Band Radar", IEEE Transactions on Microwave Theory and Techniques vol. 60, No. 3, Mar. 2012, pp. 870-880.

Mensa, "High Resolution Radar Cross-Section Imaging", Norwood, MA, Artech House, 1991, United States, 10 pages.

Sheen et al., "Combined Illumination Cylindrical Millimeter-Wave Imaging Technique for Concealed Weapon Detection", Proceedings of SPIE vol. 4032, 2000, United States, pp. 52-60.

Sheen et al., "Cylindrical Millimeter-Wave Imaging Technique for Concealed Weapon Detection", Proceedings of SPIE 26th AIPR Workshop: Exploiting New Image Sources and Sensors, Oct. 1997, United States, pp. 242-250.

Sheen et al., "Efficient Image Reconstruction Method for a Millimeter-Wave Shoe Scanner" Proceedings of SPIE Passive and Active Millimeter-Wave Imaging, vol. 11411, 2020, United States, 12 pages.

Sheen et al., "Three-Dimensional Millimeter-Wave Imaging for Concealed Weapon Detection", IEEE Transactions on Microwave Theory and Techniques vol. 49, No. 9, Sep. 2001, United States, pp. 1581-1592.

Sheen et al., "Cylindrical Millimeter-Wave Imaging Technique and Applications", Proceedings of SPIE Defense and Security Symposium vol. 6211, May 2006, United States, 10 pages.

Sheen et al., "Near-Field Three-Dimensional Radar Imaging Techniques and Applications", Applied Optics vol. 49, No. 19, Jul. 2010, United States, pp. E83-E93.

Sheen et al., U.S. Appl. No. 18/133,764, filed Apr. 12, 2023, titled "Imaging Systems and Imaging Methods", 72 pages.

Sheen et al., U.S. Appl. No. 18/133,777, filed Apr. 12, 2023, titled "Imaging Systems and Imaging Methods", 72 pages.

Sheen et al., U.S. Appl. No. 62/829,531, filed Apr. 4, 2019, titled "High-Resolution 3D Microwave Imaging of a Moving Target using Optical Motion Capture", 39 pages.

Sheen et al., U.S. Appl. No. 63/012,622, filed Apr. 20, 2020, titled "Footwear Scanning Systems and Associated Methods", 46 pages.

Sheen, "Sparse Multi-Static Arrays for Near-Field Millimeter-Wave Imaging", IEEE Global Conference on Signal and Information Processing (GlobalSIP), Dec. 2013, United States, pp. 699-702.

* cited by examiner

IMAGING SYSTEMS AND ASSOCIATED METHODS

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to imaging systems and associated methods.

BACKGROUND OF THE DISCLOSURE

Screening of personnel for concealed weapons has become increasingly important as threats to aviation and other high-security venues have evolved. The security posture at airports has been driven by high-profile events. Initial security focus was directed to detecting concealed handguns and knives. Metal detectors for passenger screening and x-ray systems for hand-carried baggage and items were largely enough to mitigate threats. These systems have also been utilized to enhance security at numerous other public venues such as public arenas, courthouses, etc. These systems have been primarily directed towards detecting objects, such as weapons, explosives, etc. which are concealed upon and under clothing of individuals.

Radar imaging technology has been shown to detect concealed weapons of individuals because these signals are able to penetrate common clothing materials and are amenable to precise mathematical focusing techniques. More recently-developed screening methods generally rely upon dual-energy transmission or computed-tomography (CT) x-ray technology for baggage and hand-carried items and metal detectors or millimeter-wave scanners for passenger screening.

At least some of the aspects of the disclosure are directed to imaging systems and methods that have increased computational efficiency compared with some conventional systems and methods.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Some aspects of the disclosure are directed towards apparatus, systems and methods for detecting objects which may be concealed upon a person, under clothing or within other objects. For example, at least some of the described aspects may be utilized in applications to detect objects, such as weapons which may be concealed on individuals, for use at checkpoints at public venues, such as airports, public events, sporting events, courthouses, concerts, etc., to reduce threats posed by the objects and individuals.

Figure 1:
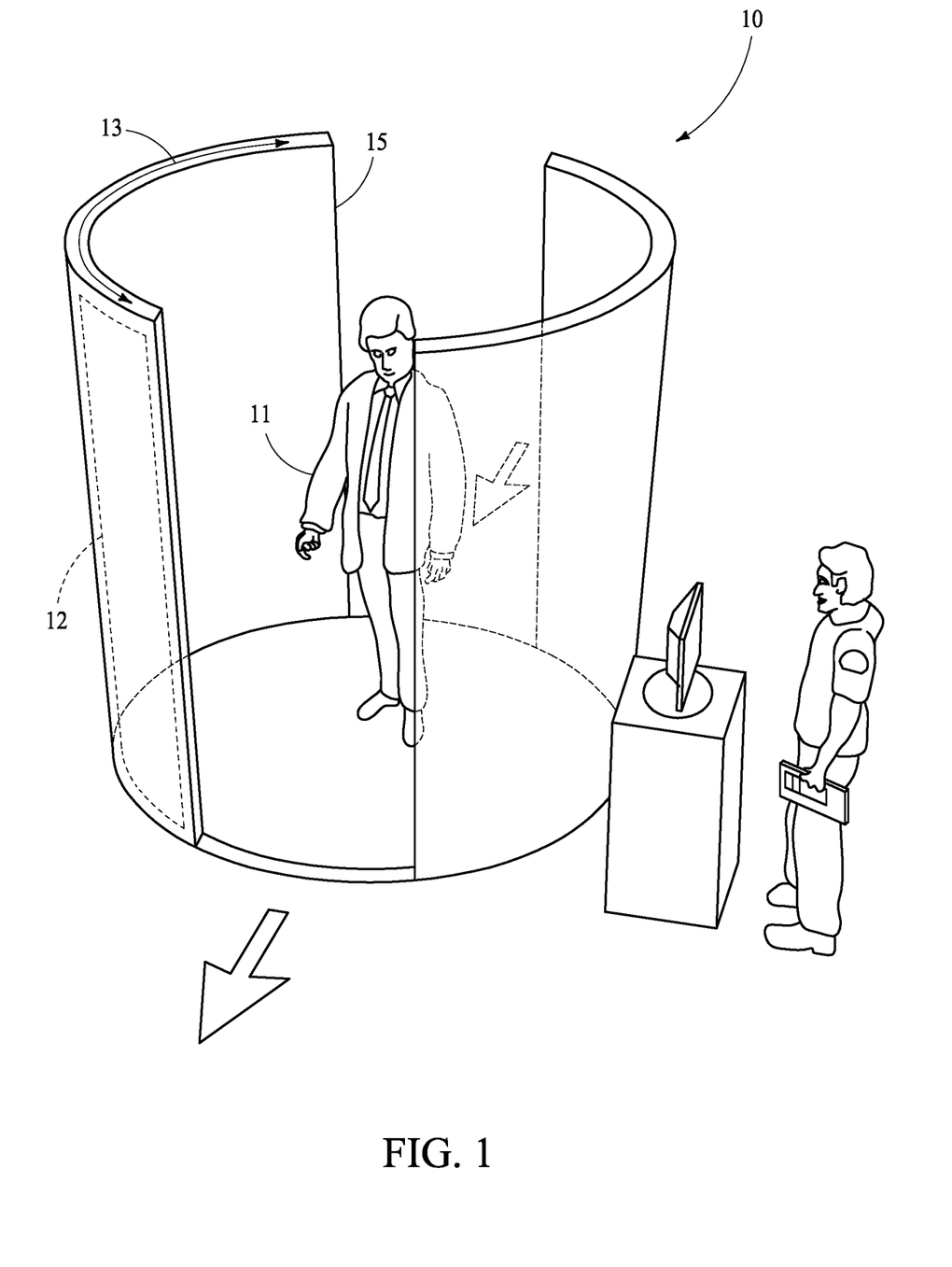
FIG. 1 is an isometric view of an imaging system according to one embodiment.

Referring to FIG. 1, an example imaging system 10 is shown according to one embodiment. The system 10 may be installed in one example application to provide threat detection at points of ingress/egress of a public facility. A person to be screened enters the system 10 which attempts to detect the presence of concealed objects, such as weapons or explosives, upon the individual and perhaps beneath and within clothing of the individual. In some embodiments, system 10 uses electromagnetic energy to scan the person and the results of the scanning may be used in one or more ways, such as displaying images of the individual resulting from the scan, processing the results using automated threat detection or artificial intelligence, and/or storing the results for subsequent processing and use.

During operation an antenna array 12 is scanned or moved along a scan path 13 within a wall 15 of the system 10 about at least a portion of a target imaging volume 14 which includes the individual 11 being scanned as electromagnetic energy is transmitted to and received from the individual 11. Although the scan path is cylindrical about the person in the illustrated embodiment, other scan paths may be used in other embodiments.

Figure 2:
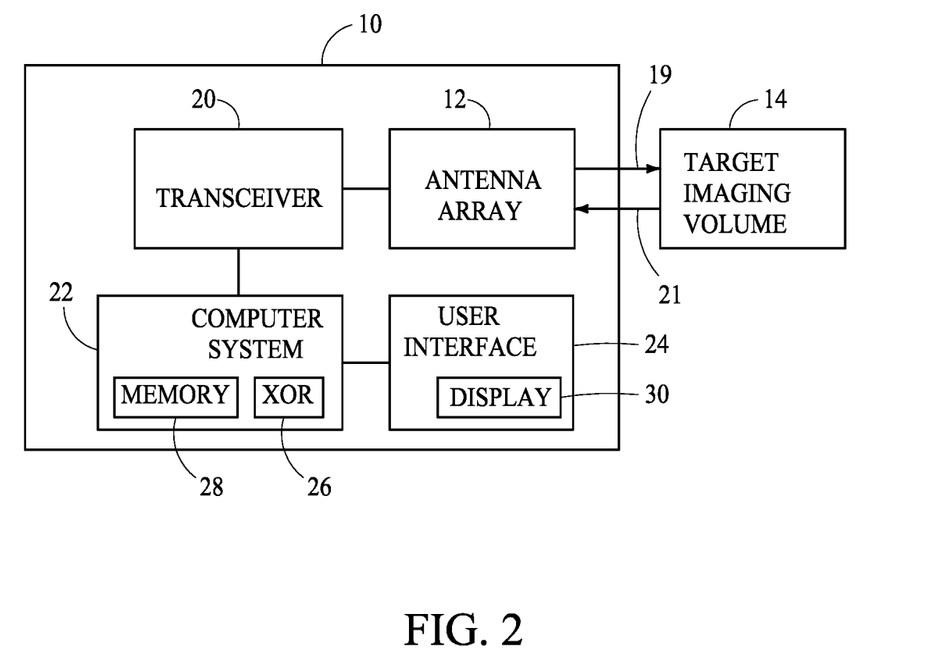
FIG. 2 is a functional block diagram of components of an imaging system according to one embodiment.

Referring to FIG. 2, components of an example imaging system 10 are shown according to one embodiment. The illustrated system 10 includes antenna array 12, transceiver 20, computer system 22 and user interface 24. Other embodiments are possible including more, less and/or alternative components.

Transceiver 20 is a frequency modulated continuous wave (FMCW) heterodyne transceiver coupled with antenna array 12 in one embodiment. Transceiver 20 controls transmission of electromagnetic energy 19 from antenna array 12 towards target imaging volume 14 and outputs signals indicative of the reflections of the electromagnetic energy 21 received via the receive antennas from the target imaging volume 14.

The electromagnetic energy 19 is emitted at frequencies capable of penetrating clothing to identify concealed items in one embodiment. In one example embodiment, electromagnetic energy 19 is swept through a bandwidth of about 10 GHz to about 40 GHz for a plurality of combinations of antennas and at each scanned position of antenna array 12 in one more specific embodiment.

Computer system 22 is coupled with transceiver 20 and includes processing circuitry 26 and storage circuitry 28.

Although not shown, computer system 22 may also include a data acquisition system configured to sample outputted signals of transceiver 20 and provide radar data indicative of electromagnetic energy transmitted and received by transceiver 20.

Processing circuitry 26 of computer system 22 processes the radar data to provide information regarding objects which may be concealed, for example beneath clothing of the individual in the target imaging volume 14, as discussed in further detail below. In one embodiment, processing circuitry 26 generates images as a result of the processing of the radar data from the scanning of the target imaging volume 14. The generated images may be processed, for example by threat detection processing methods, artificial intelligence, stored using storage circuitry 28, and/or displayed via user interface 24 in example embodiments. Processing circuitry 26 is arranged to control data access and storage, issue commands, and control other desired operations of imaging system 10.

Processing circuitry 26 may comprise circuitry configured to implement programming stored within storage circuitry 28 in at least one embodiment. For example, the processing circuitry 26 may be implemented as one or more processor(s) and/or other structure configured to execute executable instructions including, for example, software and/or firmware instructions. Other example embodiments of processing circuitry 26 include hardware logic, PGA, FPGA, ASIC, state machines, and/or other structures alone or in combination with one or more processor(s). These examples of processing circuitry 26 are for illustration and other configurations are possible.

Storage circuitry 28 is configured to store programming such as executable code or instructions (e.g., software and/or firmware), electronic data, databases, look-up tables (LUTs), sampled data, radar data or other digital information and may include computer-readable storage media. At least some embodiments or aspects described herein may be implemented using programming stored within one or more computer-readable storage medium of storage circuitry 28 and configured to control processing circuitry 26. In an illustrative example, storage circuitry 28 is implemented as random access memory, read only memory, flash memory, cache memory, hard drives, and/or other appropriate configurations.

User interface 24 is configured to interact with a user including conveying data to a user, for example via a display 30 (e.g., depicting visual images and text for observation by the user) as well as receiving inputs from the user, for example via a mouse and/or keyboard. In one embodiment, the display 30 of user interface 24 may depict images resulting from the scanning operations, such as anomalies or objects which may be concealed upon or within a subject or article being scanned. The user interface 24 may generate an indication that the individual being scanned is not a risk or may indicate that the individual should be checked further in one embodiment. In some embodiments, the images generated by the processing circuitry 22 and resulting from the processing of the radar data are not depicted via display 30 but rather are processed by threat detect methods or artificial intelligence.

Figure 3A:
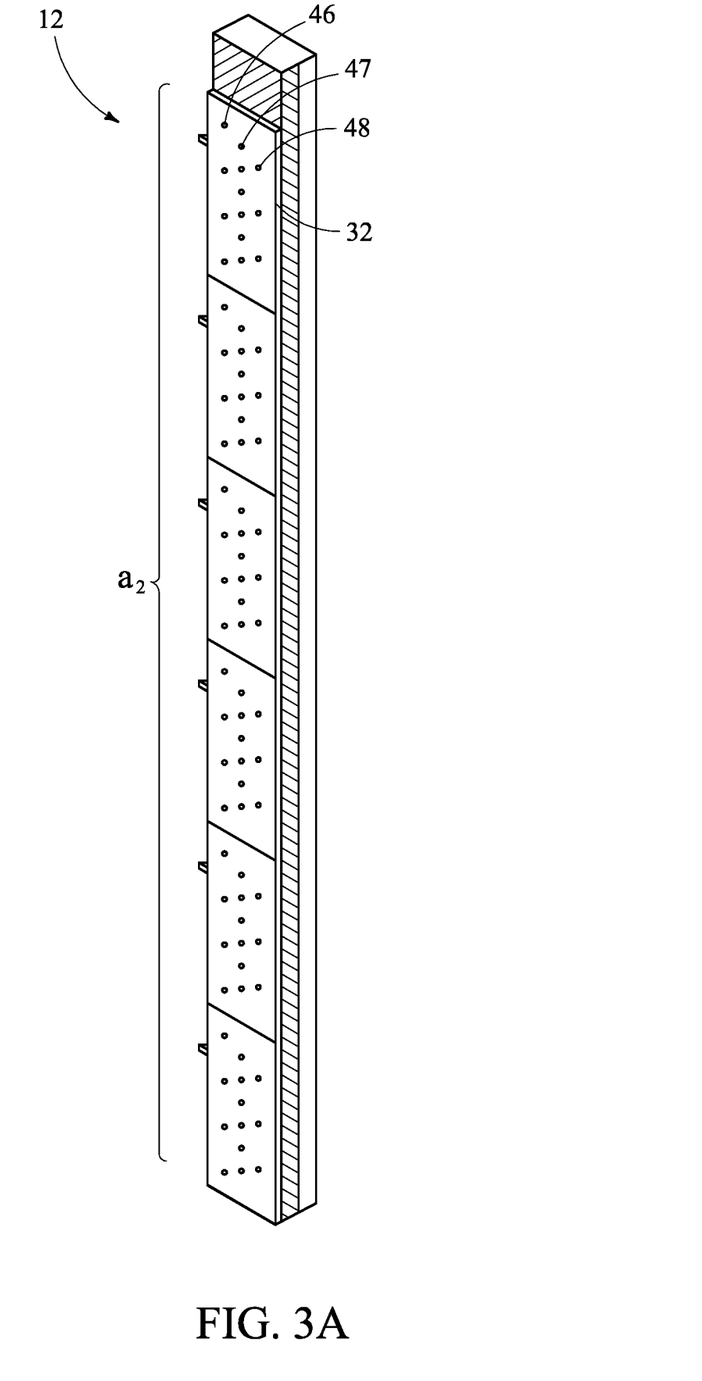
FIG. 3A is an illustrative representation of an antenna array according to one embodiment.
Figure 3B:
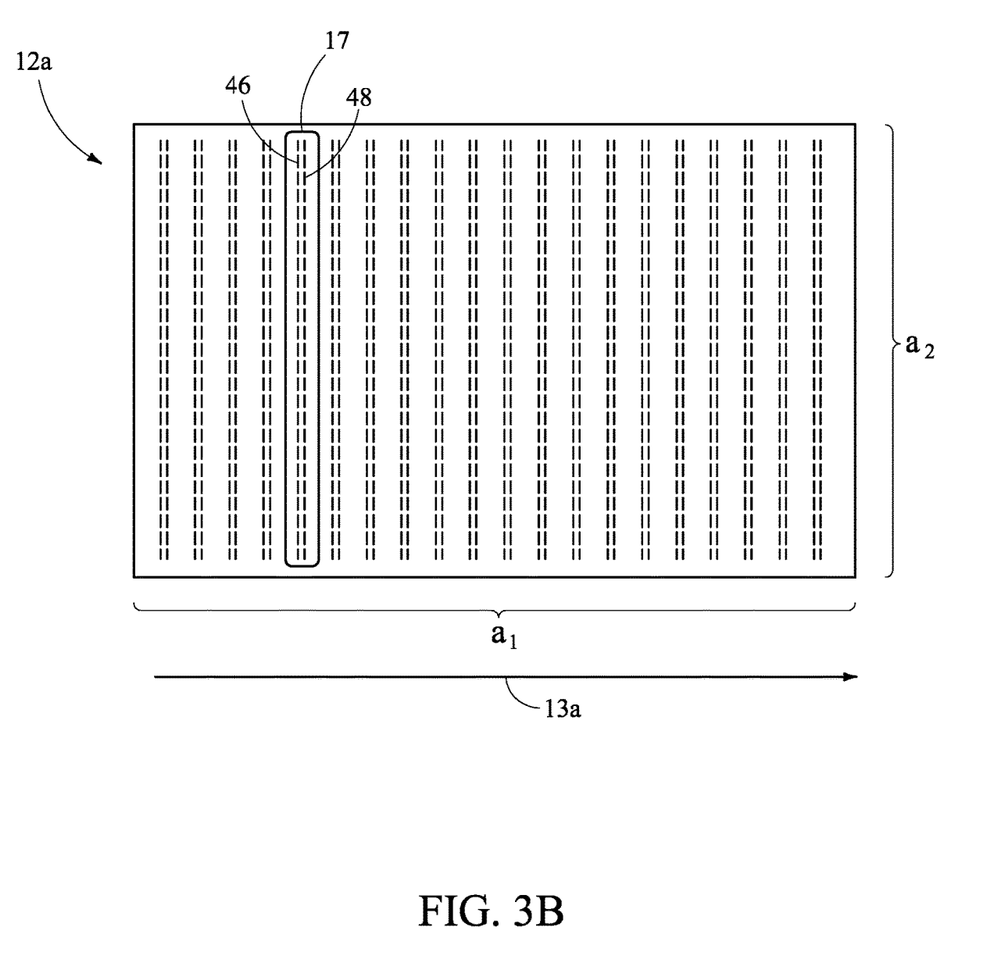
FIG. 3B is an illustrative representation of plural antenna arrays according to one embodiment.

Referring to FIGS. 3A and 3B, example antenna arrays 12, 12a are shown according to example embodiments. As discussed below, antenna array 12 of FIG. 3A is configured to move along a scan path (e.g., scan path 13 of FIG. 1) about a target imaging volume during imaging operations while antenna array 12a has a two-dimensional (2D) arrangement that is provided at a fixed position adjacent to the target imaging volume during imaging operations. Other antenna array configurations may be used in other embodiments.

Referring to FIG. 3A, the illustrated antenna array 12 includes a plurality of modules 32 that each include a plurality of transmit antennas 46 and a plurality of receive antennas 48 that are arranged along a substantially straight axis extending in the length direction of the antenna array (i.e., $a_2$ axis discussed below). The transmit antennas 46 are configured to emit electromagnetic energy towards a target imaging volume and the receive antennas 48 are configured to receive reflections of the electromagnetic energy from the target imaging volume. Modules 32 may include additional circuitry (not shown), such as switches, amplifiers, etc.

As discussed below, antenna array 12 is moved and provided at a plurality of different positions along a scan path during the transmission and reception of the electromagnetic energy providing a two-dimensional (2D) imaging aperture. The received electromagnetic energy is sampled and processed to generate images of the target imaging volume.

Figure 7:
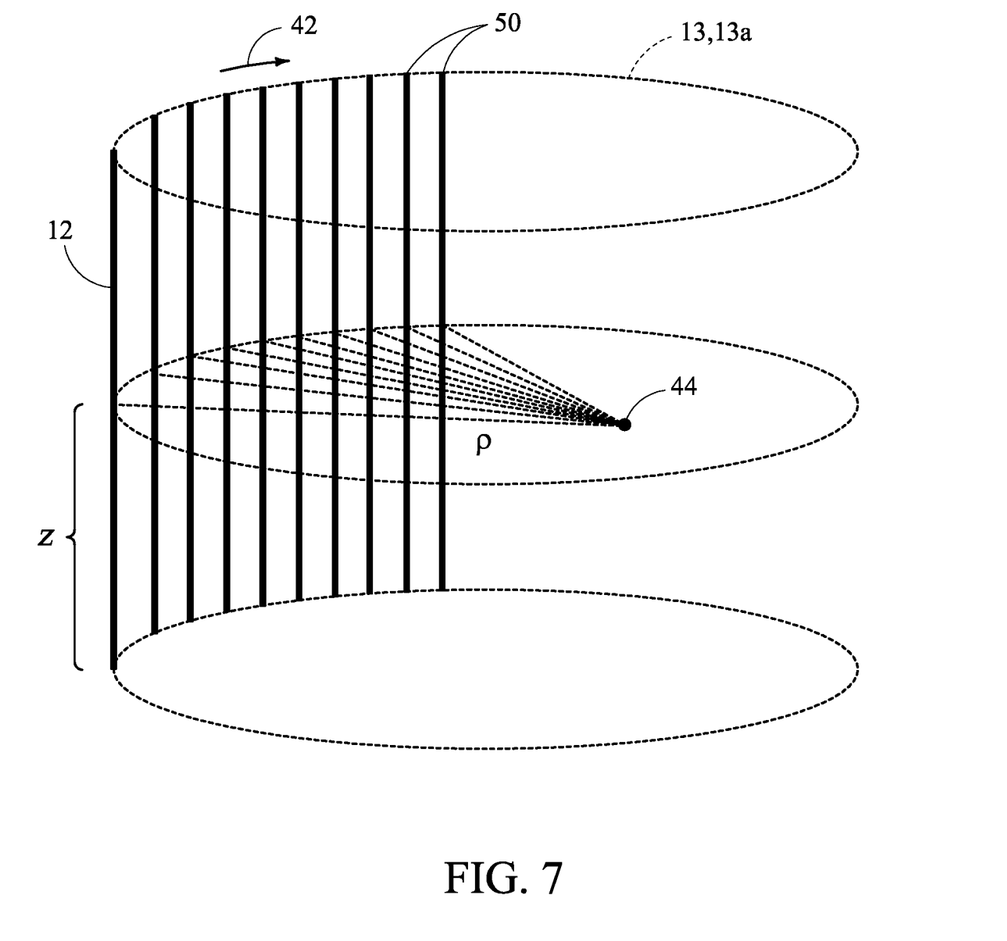
FIG. 7 is an illustrative representation of lateral focusing of radar data according to one embodiment.

Different pairs of transmit and receive 46, 48 antennas may be selected at each of a plurality of different positions along a scan path during scanning operations of the target imaging volume according to some embodiments (plural different positions 50 along a scan path 13 or 13a are shown in FIG. 7). Additional details regarding example antenna arrays and selection of different pairs of transmit and receive antennas are discussed in D. M. Sheen, "*Sparse multi-static arrays for near-field millimeter-wave imaging*," December 2013, pp. 699-702. doi: 10.1109/GlobalSIP.2013.6736987, the teachings of which are incorporated herein by reference.

A midpoint between a selected pair of antennas 46, 48 defines an aperture position 47 for the respective pair. The aperture positions 47 of the different antenna pairs 46, 48 are provided along at least a substantially straight line corresponding to the $a_2$ axis in the embodiment of FIG. 3A. As mentioned above, the antenna array 12 of FIG. 3A is moved during scanning operations and different pairs of antennas 46, 48 may be selected for scanning at each of a plurality of different positions of antenna array 12 during the scan operations.

As mentioned above, scan operations are implemented using a two-dimensional 2D aperture in the presently-described embodiment. The length of the antenna array 12 in a direction substantially orthogonal to the motion direction defines one dimension of the scanned aperture 40 and the scan path of the antenna array 12 defines another dimension of the scanned aperture 40. A first axis $a_1$ of the aperture corresponds to different positions of the antenna array 12 along the scan path of the antenna array, and a second axis $a_2$ of the aperture corresponds to different aperture positions 47 along the length of the antenna array 12.

Although not shown, system 10 may additionally include a motor that is configured to move antenna array 12 around the target imaging volume 14 during scanned operations in one embodiment.

Referring to FIG. 3B, the illustrated antenna array 12a includes a plurality of antenna sub-arrays 17 that are arranged at different positions along the $a_1$ axis of FIG. 3B. For example, antenna array 12a may be implemented at a fixed position in the wall 15 of imaging system 10 of FIG. 1. The sub-arrays 17 may each have the same configuration and comprise a plurality of transmit antennas 46 and a plurality of receive antennas 48 that are arranged in a substantially straight line and operate as discussed above with respect to FIG. 3A. The different sub-arrays 17 along the axis $a_1$ are selected at different times along a scan path 13a during the transmission and reception of electromagnetic energy to provide scanning of a 2D imaging aperture of the target imaging volume in the described embodiment. The received electromagnetic energy is sampled, stored and processed to generate images of the target imaging volume in one embodiment.

The discussion proceeds below with respect to example processing operations of the radar data to generate images of a target imaging volume. In one embodiment, the processing circuitry of the imaging system processes the radar data using backprojection 3D image reconstruction. As discussed in US Patent Publication No. 2020/0319331 A1, the teachings of which are incorporated herein by reference, one parameter to perform back-projection focusing of the reconstruction is the effective range from a selected pair of transmit and receive antennas to a given image voxel of the target imaging volume, which is defined here as one-half the round-trip distance. For a single voxel, a frequency-domain back-projection algorithm can be expressed as:

$$v(x^{img}) = \sum_{\substack{aperture \\ \{a_1,a_2\}}} w(a_1, a_2) \sum_f S(a_1, a_2, f) e^{j2kr} \qquad \text{Eq. 1}$$

where $v(x^{img})$ is the complex image amplitude or intensity at an image position or voxel $x^{img}$ of the target imaging volume, $S(a_1, a_2, f)$ is the complex radar phase-history data collected over aperture dimensions $a_1$, $a_2$ and f is frequency. An aperture weighting term $w(a_1, a_2)$ is used here to provide amplitude weighting of calculated intensities of the voxels to reduce side lobes or other artifacts in the image and which is discussed in further detail below. Note that S and w are both typically discrete multidimensional arrays rather than continuous functions in one embodiment. The conjugate phase term in this expression is $e^{j2kr}$ where $k=2\pi f/c$, c is the speed of light, and $$r=(|x^{img}-x^T|+|x^{img}-x^R|)/2 \qquad \text{Eq. 2}$$

In this expression, $x^T$ is the location of the transmitting antenna upon the antenna array and $x^R$ is the location of the receiving antenna upon the antenna array, $x^{img}$ is the image voxel location of the target imaging volume, and the round-trip distance is divided by 2 so that the range (r) is an equivalent or "effective" one-way distance to the voxel of the target from a selected pair of the transmit and receive antennas. This is done for consistency with monostatic or quasi-monostatic radar systems.

For 3D imaging, the above processing has a computational burden of $O(N^6)$ upon the processing circuitry where N is the nominal dimension of each axis of the voxel space, frequency, and aperture dimensions.

As is further discussed in US Patent Publication No. 2020/0319331 A1, the order of the process can be reduced to $O(N^5)$ by transforming the radar data from the frequency domain to the range domain and as also discussed described below. In the described embodiment, the radar data has a complex image amplitude or intensity $v(x^{img})$ at an image position or voxel $x^{img}$ of the range domain back-projection expressed in Eq. 3.

As also discussed in US Patent Publication No. 2020/0319331 A1, there is a fast phase variation of $e^{j2k_c r}$ where $k_c=(k_1+k_2)/2$ is the center wavenumber and $k_2=2\pi f_{stop}$ is the final wavenumber since the range response is queried during summation using interpolation and this phase variation may lead to errors or require that the range response be overly finely sampled. This variation can be largely removed by demodulating the data with a $e^{-j2k_c r}$ term and subsequently remodulating the data with a $e^{+j2k_c r}$ term. The complex image amplitude or intensity $v(x^{img})$ at an image position or voxel $x^{img}$ of the range domain back-projection can be expressed as $$v(x^{img}) = \sum_{a_1}\sum_{a_2} w(a_1, a_2) s(a_1, a_2, r) e^{j2k_c r} \qquad \text{Eq. 3}$$

where $$s(a_1,a_2,r)=\{iFFT_f(S(a_1,a_2,f))e^{j2k_1 r_n}e^{-j2k_c r_n}\}|_r \qquad \text{Eq. 4}$$

is the demodulated range response computed by performing an iFFT of the phase history on the frequency axis, applying a phase term of $e^{j2k_1 r} e^{-j2k_c r}$, and using interpolation (usually linear) to compute the value at range r, which is $$r=(|x^{img}-x^T|+|x^{img}-x^R|)/2 \qquad \text{Eq. 5}$$

The complete image is formed by evaluating Eq. 3 over the full 3D set of voxel locations and the overall order of the computation performed by the processing circuitry 26 is reduced from $O(N^6)$ to $O(N^5)$.

Additional improvements to the efficiency of the multi-static range-domain image reconstruction method are realized with use of antenna arrays that have at least a substantially linear configuration as shown in FIGS. 3A and 3B by taking advantage of at least substantially cylindrical (or azimuthal) symmetry around each aperture position of the antenna array during scanning. An at least substantially linear multistatic array assumes that the T and R locations are unique but are all located on a single at least substantially linear axis with the T-R combinations generated sequentially (described by the $a_2$ axis). According to one embodiment, the antenna array may be moved as a rigid body during scanning operations with a plurality of combinations of transmit and receive antennas sampled at each position (described by the $a_1$ axis). In other embodiments, different antenna arrays at different positions may be selected and a plurality of combinations of transmit and receive antennas of the antenna arrays may sampled at the different positions (also described by the $a_1$ axis).

Figure 4:
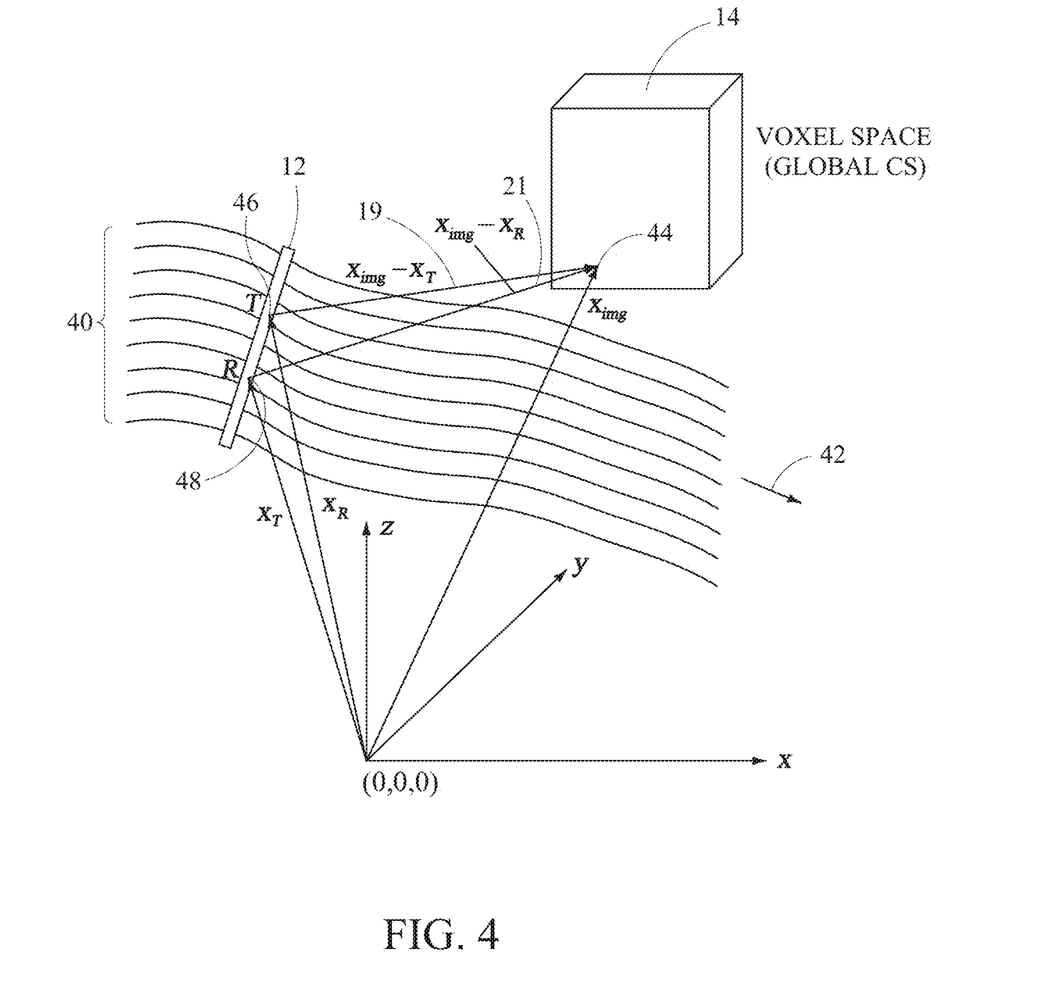
FIG. 4 is an illustrative representation of a multistatic scanned aperture imaging system according to one embodiment.

An example configuration is shown in FIG. 4 where transmit and receive antennas of antenna array 12 are electronically or mechanically scanned over a two-dimensional aperture 40 to transmit electromagnetic energy towards target imaging volume 14 and receive electromagnetic energy reflected from volume 14. In one embodiment, a target (e.g., individual) is stationary within target imaging volume 14 as antenna array 12 moves along a motion direction 42 past the target imaging volume 14. In other embodiments, different antenna arrays are selected to scan the aperture 40 about the imaging target volume 14. One of a plurality of voxels 44 (i.e., $x^{img}$) is shown receiving electromagnetic energy from a transmit antenna 46 of a selected pair of antennas and reflecting electromagnetic energy to a receive antenna 48 of the selected pair of antennas.

The movement of antenna array 12 (or selection of different antenna arrays) during scanning provides the scanned aperture 40 which includes different transmit and receive combinations of the antennas of the antenna array 12 whose effective phase center spans the extent of the aperture 40. Different pairs of transmit and receive antennas are electronically and mechanically scanned over a two-dimensional (2D) aperture 40 as the antenna array 12 (or selection of different antenna arrays) moves in a direction 42 which is substantially orthogonal to an axis of antenna array 12 in one embodiment. The movement of antenna array 12 may be controlled along a fixed path as in the example embodiment shown in FIG. 1.

Antenna array 12 emits electromagnetic energy in the direction of the target imaging volume 14 and the aperture 40 is scanned. In one example, the image volume is 1 m by 1 m by 2 m and is discretized as 5 mm voxels.

Figure 5:
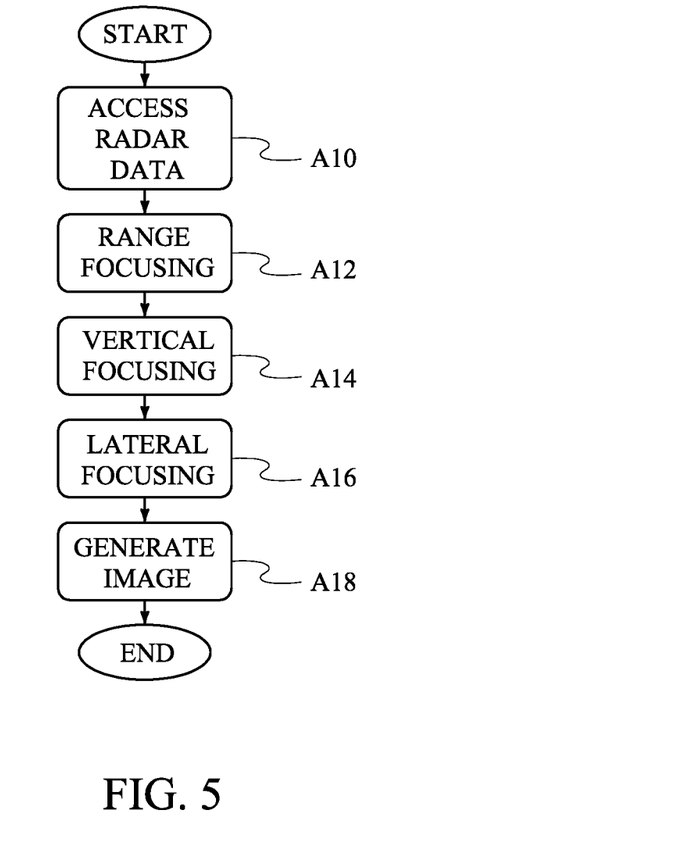
FIG. 5 is a flow chart of a radar data focusing method according to one embodiment.

Referring to FIG. 5, one example method of processing radar data resulting from the scanning operations is shown and may be performed by processing circuitry according to one embodiment. As discussed below, the radar data is focused in three dimensions (e.g., range, vertical and lateral dimensions) in separate processing acts. Other methods are possible including more, less and/or alternative acts.

At an act A10, radar data generated following a scan of a target imaging volume is accessed from storage circuitry.

At an act A12, the processing circuitry focuses the radar data in a range dimension. In one embodiment, the processing circuitry converts the frequency domain data $S(a_1, a_2, f)$ to the range domain that focuses the radar data in the range dimension. In one embodiment, Eqs. 3-5 discussed above are used to provide the range focusing.

In the presently-described embodiment, movement of the antenna array 12 along a scan path 13 per FIG. 3A (or selection of different antenna sub-arrays along a scan path 13*a* per FIG. 3B) at different positions about the target imaging volume defines a first dimension ($a_1$) of the imaging aperture. The length axis ($a_2$) of the antenna array 12 includes different aperture positions for associated different pairs of transmit and receive antennas and that defines a second dimension of an imaging aperture.

Different pairs of transmit and receive antennas are selected at each position along the scan path 13, 13*a* and define a plurality of aperture positions along the antenna axis ($a_2$) of the imaging aperture. The movement of the antenna array along the scan path (or selection of different antenna arrays) provides additional aperture positions using selected pairs of antennas. The processing circuitry is configured to provide range focused data using Eqs. 3-5 for each of the aperture positions ($a_1$, $a_2$) of the imaging aperture according to one embodiment. The results of the range focusing may be pre-computed and stored using the storage circuitry as a series of range response waveforms or one dimensional (1D) look-up tables (LUTs) with one 1D LUT for each aperture position in one embodiment. The range focusing according to the described embodiment eliminates repetitive evaluation of the frequency summation used in conventional reconstruction.

At an act A14, the processing circuitry uses the range focused data of act A12 to focus the radar data in a vertical dimension. Processing of radar data per Eq. 3 above involves a summation over the two aperture axes ($a_1$, $a_2$). Plural dimensions of the target imaging volume include a cylindrical radius (p) from the array to a given location of the target imaging volume and the cylindrical elevation (z) of the given location relative to the array axis and origin (0, 0, 0). With use of an at least substantially linear multistatic array, the results of the array axis summation ($a_2$) depend on the cylindrical radius (p) from the array to the voxel location and the cylindrical elevation (z). The linear axis array summations are pre-computed as a plurality of intermediate response values for the locations of the target imaging volume with values drawn from act A12 and stored using the storage circuitry as a series of two-dimensional (2D) look-up tables (LUTs) with one table for each position of the antenna array along the $a_1$ axis according to one embodiment. The image reconstruction method appears in Eq. 6 as $$v(x_{img}) = \underbrace{\sum_{a1}\sum_{a_2} w(a_1, a_2) s(a_1, a_2, r) e^{j2k_c r}}_{pre-computed\ for\ each\ a_1\ position} \qquad \text{Eq. 6}$$

The set of two-dimensional (2D) LUTs can be defined in Eq. 7 as $$s_{CFBP}(a_1, \rho, z) = \sum_{a_2} w(a_1, a_2) s(a_1, a_2, r) e^{j2k_c r}, \qquad \text{Eq. 7}$$

where $$r = (\sqrt{\rho^2 + (z-z_T)^2} + \sqrt{\rho^2 + (z-z_R)^2})/2 \qquad \text{Eq. 8}$$

Figure 6:
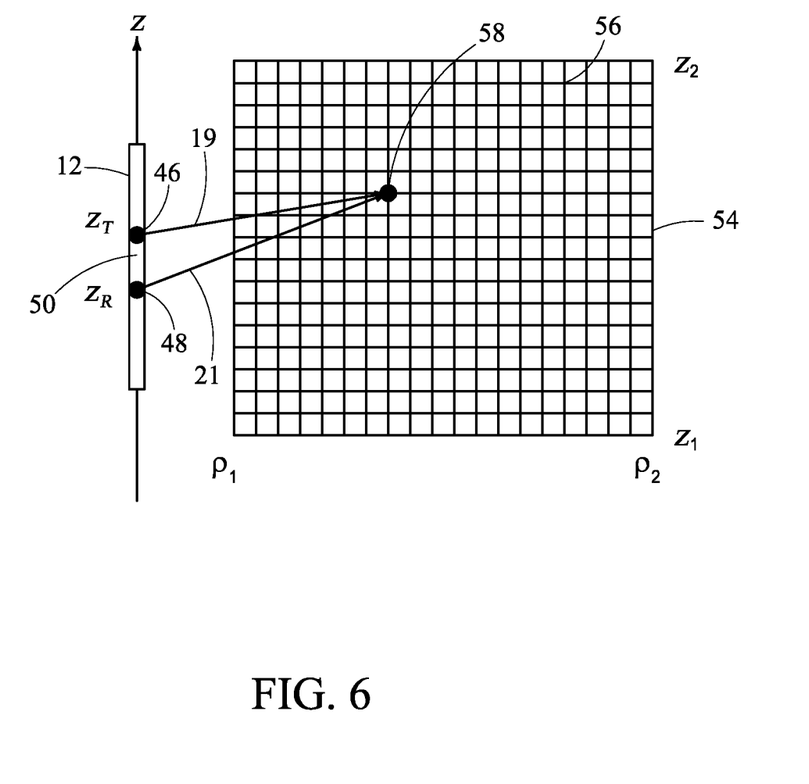
FIG. 6 is an illustrative representation of vertical focusing of radar data according to one embodiment.

Referring to FIG. 6, a 2D LUT is generated for each of a plurality of different positions as array 12 of FIG. 3A or antenna sub-arrays 17 of FIG. 3B are scanned along respective scan paths 13, 13*a*. Only one example position 50 of array 12 along scan path 13 (or alternatively a single antenna sub-array 17 along scan path 13*a*) is shown in FIG. 6. Different pairs of antennas 46, 48 are selected to transmit and receive electromagnetic energy at each position 50 of the respective scan path 13, 13*a* and a plurality of intensity values are determined for the aperture positions that correspond to the respective selected pairs of antennas for each position 50.

The generated 2D LUT tables are evaluated over a two-dimensional space or grid 54 of a plurality of (p,z) locations 56 that encompass the ranges and elevations of interest of the target imaging volume for each position 50 of transmit and receive antennas along the respective scan path 13, 13*a*. FIG. 6 depicts an example transmit antenna 46 emitting electromagnetic energy to one example location 58 of the grid 54 and receive antenna 48 receiving electromagnetic energy from location 58. The two-dimensional spaces for the different positions 50 of the array (or selection of different antenna arrays located at the different positions) have at least substantially cylindrical symmetry about the antenna array(s) 12. Each 2D LUT includes intermediate response values (e.g., intensity values) for the respective locations 56 of the grid 54 using Eqs. 7-8.

Practical evaluation of the 2D LUTs reveals that they have fast phase variation in the p dimension. This is similar to that observed in conversion of the radar data from the frequency-domain to the range-domain and can be largely removed by demodulating the data with a $e^{-j2k_c\rho}$ and subsequently remodulating the data with a $e^{+j2k_c\rho}$ term. This is shown in the image reconstruction equation as Eq. 9:

$$v(x_{img}) = \sum_{a_1} \underbrace{\left(\sum_{a_2} w(a_1, a_2) s(a_1, a_2, r) e^{j2k_c r}\right) \underbrace{e^{-j2k_c\rho}}_{demodulation}}_{pre-computed\ and\ stored\ as\ 2D\ LUT\ for\ each\ a_1\ aperture\ position} \underbrace{e^{j2k_c\rho}}_{modulation} \qquad \text{Eq. 9}$$

With the demodulation and remodulation terms included, the 2D LUT functions become, $$s_{CFBP}(a_1, \rho, z) = \sum_{a_2} w(a_1, a_2) s(a_1, a_2, r) e^{j2k_c r} e^{-j2k_c\rho} \qquad \text{Eq. 10}$$

In an act A16, the final image focusing is implemented as lateral focusing of the radar data. The final image focusing is computed by summing over the array translation or scan axis ($a_1$) with values drawn from the 2D LUTs generated in act A14 and the results stored as the final image. As mentioned above, a 2D LUT is generated for each position 50 along a respective scan path 13, 13a and includes intermediate response values for different pairs of transmit and receive antennas. Using the 2D LUTs determined in act A14, the image focusing equation becomes $$v(x_{img}) = \sum_{a_1} \{s_{CFBP}(a_1, \rho_m, z_n)\}|_{\rho,z} e^{j2k_c\rho} \quad \text{Eq. 11}$$

where $$\rho = \sqrt{(x_{img}-x_a)_x^2 + (x_{img}-x_a)_y^2} \quad \text{Eq. 12}$$

$$z = \sqrt{(x_{img}-x_a)_z^2} \quad \text{Eq. 13}$$

$x_a$ = array origin position vector (function of $a_1$) \quad Eq. 14

In this equation, the notation $\{s_{CFBP}(a_1, \mu_m, z_n)\}|_{\rho,z}$ implies evaluating the set of values that are discretely sampled at cylindrical radii $\rho_m$ and elevations $z_n$ at the specific position ($\rho$,z) using 2D interpolation. Evaluation of Eqs. 11-14 provides lateral focusing of the radar data and is depicted in FIG. 7. The radar data is laterally focused using a one-dimensional (1D) summation of the intermediate response values over the different positions 50 of the transmit and receive antennas along the array scan axis ($a_1$) for each voxel 44 in one embodiment.

In the presently-described embodiment, a plurality of intermediate response values from the 2D LUTs that correspond to a given voxel are selected and used by the processing circuitry to generate a final response value for the voxel in act A16. For each of a plurality of voxels of the target imaging volume, the processing circuitry uses a location of a respective voxel to identify one of the intermediate response values from each of the 2D LUTs for each of the different positions 50 along the scan path 13, 13a. In one more specific embodiment, the processing circuitry is configured to, for each of the voxels, identify a plurality of cylindrical radii and a plurality of cylindrical elevations, and to use the cylindrical radii and the cylindrical elevations to select the intermediate response values from the 2D LUTs that correspond to the voxels. In the described embodiment, the processing circuitry sums the identified intermediate response values from the 2D LUTs to determine a final response value for the respective voxel $v(x^{img})$ as the complex image amplitude or intensity at the three-dimensional (3D) image position or voxel $x^{img}$ of the target imaging volume. A plurality of final response values for the voxels of the target imaging volume are provided as a result of the processing of act A16 and comprise an image of the target imaging volume.

In one embodiment, the 2D interpolation used to extract values from the vertically focused 2D LUTs may be simplified. One application of Eq. 11 uses 2D interpolation, such as bilinear interpolation. While $\rho$ interpolation is used, the z-interpolation can be eliminated in systems in which the vertical (z) axis of the antenna array is always aligned with the vertical axis of the target image volume or voxel space. In this case, the vertically-focused 2D LUTs can be computed directly onto a z-sampling grid that matches the voxel space and simple linear (not bilinear) interpolation can be used that reduces errors and improves computational efficiency.

At act A18, the generated image resulting from the backprojection is stored using storage circuitry. The image may also be displayed using the user interface, and/or processed by threat detection methods or artificial intelligence in example applications.

Each voxel evaluation utilizes O(N) calculations, therefore the overall computational burden is $O(N^4)$ for this final focusing operation. The vertical focusing operation that calculates the 2D LUTs is also $O(N^4)$ and the conversion to the range domain requires $O(N^2)$ FFTs which are each O(N log N) for overall $O(N^3$ log N). Combining acts A10-A16 provides a total computational burden of $O(N^4)$ that is a significant decrease from range-domain backprojection which is $O(N^5)$ as mentioned above.

According to the above-described method, the processing circuitry processes the radar data to provide first focused data in a first (e.g., range) dimension of the target imaging volume, uses the first focused data to focus the radar data in a second (e.g., vertical) dimension of the target imaging volume to provide second focused data, and uses the second focused data to focus the radar data in a third (e.g., lateral) dimension of the target imaging volume to provide third focused data comprising an image of the target imaging volume.

Referring to FIGS. 8A-8D, an evolution of data acquired from scanning the target imaging volume during the different range, vertical and lateral focusing acts A12, A14, A16 is shown. FIGS. 8A-8D illustrate the dimensionality of the 3D data arrays for an example target consisting of a single point scatterer at the center of the aperture. Vertical cut-planes 60 and horizontal cut-planes 62 from the 3D sets are shown to highlight the range, vertical, and lateral focusing operations.

Figure 8A:
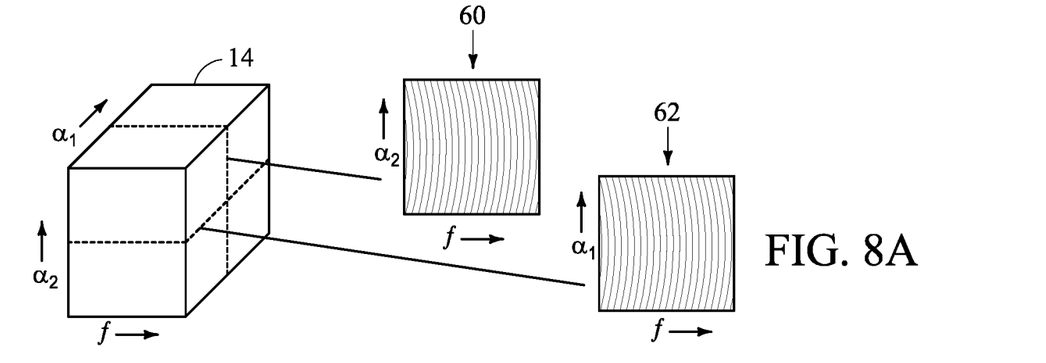
FIGS. 8A-8D are illustrative representations of the evolution of radar data during focusing operations according to one embodiment.

Referring to FIG. 8A, the sampled radar data is unfocused in three dimensions of the aperture axes $a_1$, $a_2$ and frequency prior to the processing of act A12 of FIG. 5.

Figure 8B:
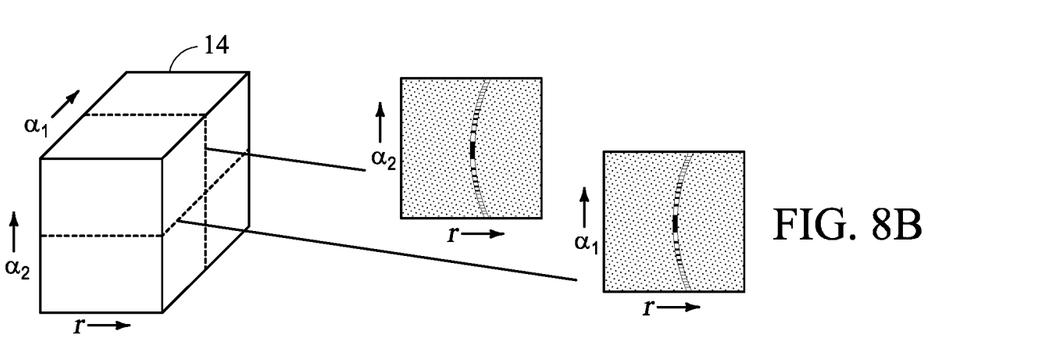

Referring to FIG. 8B, the sampled data is focused in the range dimension and is unfocused in the aperture axes $a_1$, $a_2$ as a result of the processing of act A12 in FIG. 5.

Figure 8C:
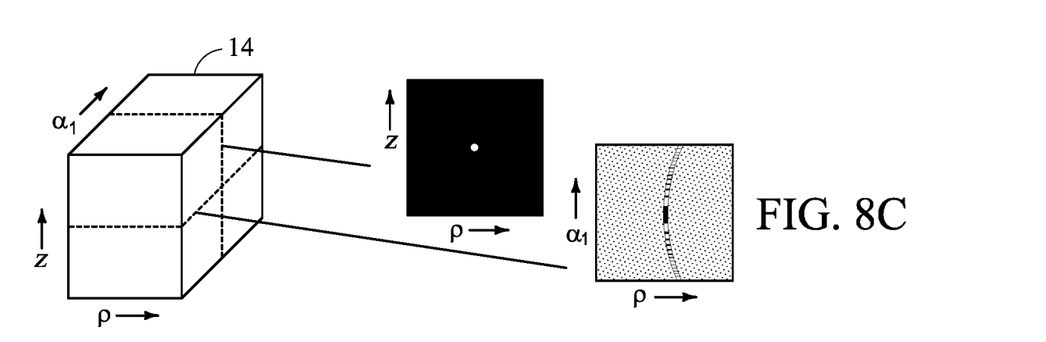

Referring to FIG. 8C, the sampled data is focused in the vertical dimension and is unfocused in the aperture axis $a_1$ and $\rho$ dimensions as a result of the processing of act A14 in FIG. 5.

Figure 8D:
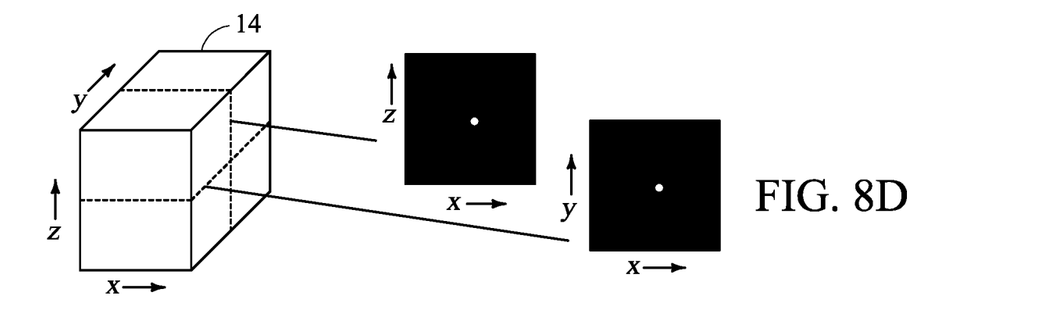

Referring to FIG. 8D, the sampled data is focused in x, y, z dimensions of a 3D Cartesian coordinate system as a result of processing of act A16 in FIG. 5.

According to some embodiments, physical antenna arrays and associated radar transceivers may be phase and amplitude calibrated for improved accuracy in 3D imaging performance. Array calibration can compensate for phase and amplitude response differences between array elements (e.g., pairs of transmit and receive antennas). Calibration of this response over the full frequency range can also correct for non-ideality of the phase and amplitude response of the transceiver used to drive the antenna array.

Figure 9:
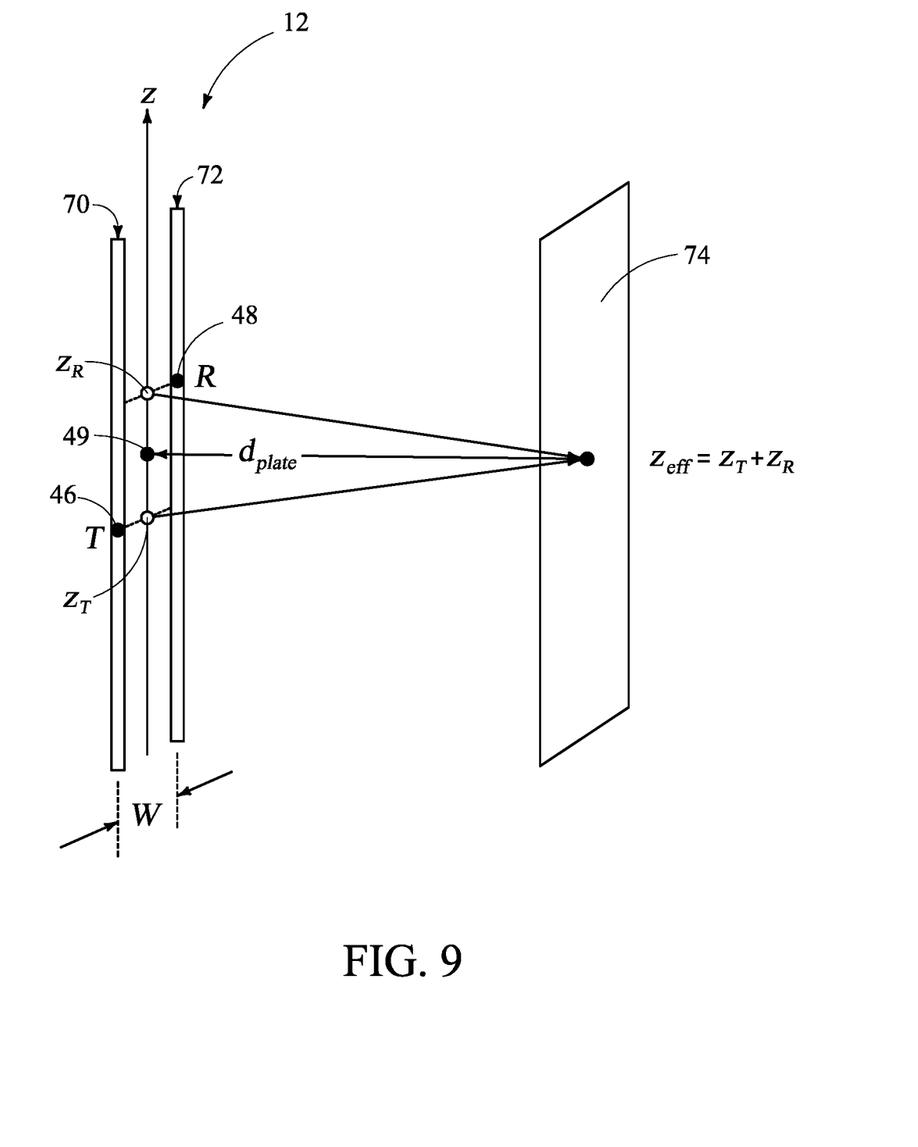
FIG. 9 is an illustrative representation of an antenna array and calibration plate according to one embodiment.

Referring to FIG. 9, antenna array 12 calibration can be conveniently performed using data collected from scanning a flat metal calibration plate 74 (or cylinder that is not shown) along with data collected from an empty ("air") scan. The air measurement is used in a baseline subtraction process to remove common signals present in all collected waveforms, and the plate measurement is used to level the amplitude response and align the phase response in one embodiment.

An example antenna array 12 is shown in FIG. 9 that includes two columns, with one column 70 dedicated to transmitting (T) antennas 46 and the other column 72 dedicated to receiving (R) antennas 48. The columns 70, 72 of transmit and receive antennas 46, 48 are substantially straight in the illustrated embodiment. Some of the above-described methods assume that multistatic arrays are truly linear, i.e., with all T and R antennas aligned on a common linear axis so that cylindrical/azimuthal symmetry is preserved and a 2D ($\rho$,z) LUT may be used to fully characterize the response from the antenna array at a given scanning position. Microwave and millimeter-wave imaging systems commonly use separate T and R antennas that are closely spaced and considered to be "quasi-monostatic" where an antenna pair 46, 48 effectively operates as a single antenna located at the midpoint 49 (i.e., aperture position) between the two antenna phase centers. An array calibration process may be implemented to make a two-column antenna array approximate a single-column linear antenna array arranged along at least a substantially straight line.

In one embodiment, calibration of the antenna array 12 compares baseline-subtracted measured data from a calibration metal target plate 74 with a theoretically expected complex response over a range of frequencies. This comparison allows direct computation of the complex (amplitude and phase) correction to level the amplitude response and align the phase response. Correction of a two-column antenna array to single-column can also be embedded into the calibration process by assuming that the T and R antennas lie along a linear array axis when calculating the expected response. This will implicitly add the correction due to the slightly shorter path lengths in the single-column configuration relative to the dual-column configuration. The expected response from the aligned flat plate 74 assumes that the specular reflection occurs at a distance $d_{plate}$ from a mid-point 49 between a pair of transmit and receive antennas 46, 48 and normal to the array axis, or, $$V_{exp}(a_2, f) = e^{-j2k\left(\sqrt{(z_T - z_{eff})^2 + d_{plate}^2} + \sqrt{(z_R - z_{eff})^2 + d_{plate}^2}\right)/2} \quad \text{Eq. 15}$$

This response is complex, frequency dependent and varies with the locations of each T and R antenna pair which are assumed to be indexed by the $a_2$ axis. Mid-point 49 corresponds to an aperture position for the illustrated pair of transmit and receive antennas 46, 48.

Calibration measurements include a baseline (air) scan, $V_{meas,air}(a_2,f)$, and plate scan $V_{meas,plate}(a_2,f)$, where these measurements are also frequency dependent and vary with the locations of each T and R antenna pair, which are assumed to be indexed by the $a_2$ axis. Using these measurements and the expected response, a calibration for each antenna pair is computed as, $$V_{cal}(a_2, f) = \frac{V_{exp}(a_2, f)}{V_{meas,plate}(a_2, f) - V_{meas,air}(a_2, f)} \quad \text{Eq. 16}$$

This calibration waveform and measured baseline can be applied to each array position ($a_1$) of the raw frequency domain imaging data using $$S_{calibrated}(a_1,a_2,f) = (S_{raw}(a_1,a_2,f) - V_{meas,air}(a_2,f))V_{cal}(a_2,f) \quad \text{Eq. 17}$$

In some practical imaging systems, it is desirable to only calibrate the phase response of the array and transceiver. Compensating for low-amplitude responses can increase noise and artifacts in the images and emphasizing these responses may not be desired. In this case, the calibration waveform can be normalized by dividing out its amplitude and using $V_{cal}/|V_{cal}|$ in place of $V_{cal}$ in Eq. 17 which allows alignment of the phase response.

The aperture weighting term $w(a_1,a_2)$ used in the image reconstruction formulas of Eq. 1, 3, 6, 7, 9 and 10 can be used to control sidelobes. For scanned apertures, a Hamming, Hanning, Kaiser, or other window functions may be applied to each aperture dimension of the data, $S(a_1, a_2, f)$, to control sidelobes. Windowing the data along the frequency axis controls sidelobes in the range direction. The aperture weighting term may be used with apertures that are sampled uniformly, and have smooth regular shapes, such as planar or cylindrical apertures.

Some of the imaging methods described herein are innately qualitative in that they identify the location and intensity of direct scattering rather than measuring fundamental properties of the target's material composition. The imaging methods of some embodiments dramatically improve the efficiency of processing of the radar data by separating the multi-level summations into several steps consisting of (1) range focusing, (2) vertical focusing, and (3) lateral focusing. The computational burden of the methods disclosed herein is $O(N^4)$ which is a dramatic improvement relative to range-domain backprojection, which is $O(N^5)$ and frequency-domain backprojection, which is $O(N^6)$.

Errors due to interpolations to extract complex values from the range-domain data and the vertically focused 2D LUTs are minimal even for simple linear interpolation due to the demodulation terms introduced into some of the formulations described above. The demodulation and subsequent remodulation according to some embodiments described above allow convenient and efficient representation of intermediary results. Another small approximation is the calibration of the two-column arrays into an effective single-column array according to some embodiments. These errors or approximations have relatively minor impact on the imaging performance of the imaging systems.

Some of the imaging methods discussed herein provide simultaneous range focusing and vertical focusing with data acquisition (assuming that the array axis is sequenced at high speed with the sampling completed for each array position). The lateral focusing described herein of act A16 of FIG. 5 is extremely fast and for cylindrical scans it allows overlapping angular segments to be computed efficiently since the processing of acts A12 and A14 need not be repeated. In addition, methods described herein are straightforward to implement and well-suited for implementation on modern graphical processing units (GPUs).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An imaging system comprising:
an antenna array comprising a plurality of transmit antennas and a plurality of receive antennas that are arranged along an at least substantially straight axis;
wherein the transmit antennas are configured to emit electromagnetic energy towards a target imaging volume and the receive antennas are configured to receive reflections of the electromagnetic energy from the target imaging volume;
wherein the transmit antennas and the receive antennas are located at a plurality of different positions along a scan path at different moments in time during the emission and reception of the electromagnetic energy;
a transceiver coupled with the antenna array, wherein the transceiver is configured to control the emission of the electromagnetic energy from the transmit antennas and to output signals indicative of the reflections of the electromagnetic energy received via the receive antennas;
a data acquisition system configured to sample the signals to provide radar data; and
processing circuitry configured to:
focus the radar data to provide first focused data in a first dimension of the target imaging volume;
use the first focused data to focus the radar data in a second dimension of the target imaging volume to provide second focused data; and
use the second focused data to focus the radar data in a third dimension of the target imaging volume to provide third focused data comprising an image of the target imaging volume.

2. The system of claim 1 wherein the first dimension is a range dimension of the target imaging volume.

3. The system of claim 2 wherein the at least substantially straight axis of the antenna array defines a first dimension of an imaging aperture, the different positions of the transmit and receive antennas define a second dimension of the imaging aperture, a plurality of pairs of transmit and receive antennas define a plurality of different aperture positions of the imaging aperture along the at least substantially straight axis and corresponding to the different positions of the transmit and receive antennas, and the processing circuitry is configured to provide the first focused data for each of the aperture positions of the imaging aperture.

4. The system of claim 1 wherein the second dimension is a vertical dimension of the target imaging volume.

5. The system of claim 4 wherein the processing circuitry is configured to provide the second focused data comprising a plurality of intermediate response values for a plurality of locations of the target imaging volume.

6. The system of claim 5 wherein the locations of the target imaging volume correspond to locations of different cylindrical radii and different cylindrical elevations for each of the different positions of the transmit and receive antennas.

7. The system of claim 1 wherein the third dimension is a lateral dimension of the target imaging volume.

8. The system of claim 7 wherein the processing circuitry is configured to provide the third focused data comprising a plurality of final response values for a plurality of voxels of the target imaging volume.

9. The system of claim 1 further comprising storage circuitry configured to store the second focused data comprising intermediate response values in a plurality of look up tables corresponding to the different positions of the transmit and receive antennas, wherein the processing circuitry is configured to provide the third focused data comprising a plurality of final response values for a plurality of voxels of the target imaging volume and wherein the processing circuitry is configured to use one of the intermediate response values from each of the look up tables to provide one of the final response values.

10. The system of claim 9 wherein the processing circuitry is configured to, for each of the voxels, identify a plurality of cylindrical radii and a plurality of cylindrical elevations, and to use the cylindrical radii and the cylindrical elevations to identify the intermediate response values from the look up tables.

11. The system of claim 1 further comprising a user interface configured to display images, and wherein the processing circuitry is configured to use the third focused data to display an image of the target imaging volume.

12. The system of claim 1 wherein the processing circuitry is configured to demodulate the first focused data to remove fast phase variations prior to focusing of the radar data in the second dimension.

13. The system of claim 1 wherein the processing circuitry is configured to demodulate the second focused data to remove fast phase variations prior to the focusing of the radar data in the third dimension.

14. The system of claim 1 wherein the antenna array is configured to move to provide the transmit and receive antennas at the different positions.

15. The system of claim 1 wherein the antenna array comprises a plurality of antenna sub-arrays comprising the transmit and receive antennas at the different positions.

16. The system of claim 1 wherein the scan path is fixed.

17. The system of claim 16 wherein the scan path is cylindrical.

18. An imaging system comprising:
an antenna array comprising a plurality of transmit antennas and a plurality of receive antennas that are arranged along an at least substantially straight axis;
wherein the transmit antennas are configured to emit electromagnetic energy towards a target imaging volume and the receive antennas are configured to receive reflections of the electromagnetic energy from the target imaging volume;
wherein the transmit antennas and the receive antennas are located at a plurality of different positions along a scan path at different moments in time during the emission and reception of the electromagnetic energy;
a transceiver coupled with the antenna array, wherein the transceiver is configured to control the emission of the electromagnetic energy from the transmit antennas and to output signals indicative of the reflections of the electromagnetic energy received via the receive antennas;
a data acquisition system configured to sample the signals to provide radar data; and
processing circuitry configured to:
convert frequency data within the radar data to range data;

for each of the different positions of the transmit and receive antennas, use the range data to determine a plurality of intermediate response values for a plurality of locations of the target imaging volume; and for each of a plurality of voxels of the target imaging volume, use a location of the respective voxel to identify one of the intermediate response values for each of the different positions of the transmit and receive antennas and use the identified response values to determine a final response value for the respective voxel; and wherein the final response values for the voxels comprise an image of the target imaging volume.

19. The system of claim 18 wherein the at least substantially straight axis of the antenna array defines a first dimension of an imaging aperture, the different positions of the transmit and receive antennas define a second dimension of the imaging aperture, a plurality of pairs of transmit and receive antennas define a plurality of different aperture positions of the imaging aperture along the at least substantially straight axis and corresponding to the different positions of the transmit and receive antennas, and the processing circuitry is configured to provide the range data for each of the aperture positions of the imaging aperture.

20. The system of claim 18 wherein the use of the range data to determine the intermediate response values focuses the radar data in a vertical dimension of the target imaging volume.

21. The system of claim 18 wherein the locations of the target imaging volume correspond to locations of different cylindrical radii and different cylindrical elevations for each of the different positions of the transmit and receive antennas.

22. The system of claim 18 wherein the processing circuitry is configured to determine the intermediate response values in a two dimensional space for each of the different positions of the transmit and receive antennas, and the two dimensional spaces for the different positions of the transmit and receive antennas have at least substantially cylindrical symmetry about the antenna array.

23. The system of claim 18 further comprising storage circuitry configured to store the intermediate response values in a plurality of look up tables corresponding to the different positions of the transmit and receive antennas, and wherein the processing circuitry is configured to use the location of the voxels to identify the intermediate response values from the look up tables.

24. The system of claim 23 wherein the processing circuitry is configured to, for each of the voxels, identify a plurality of cylindrical radii and a plurality of cylindrical elevations, and to use the cylindrical radii and the cylindrical elevations to identify the intermediate response values from the look up tables.

25. The system of claim 18 further comprising a user interface configured to display images, and wherein the processing circuitry is configured to use the third focused data to display an image of the target imaging volume.

26. The system of claim 18 wherein the processing circuitry is configured to demodulate the range data to remove fast phase variations prior to the determination of the intermediate response values.

27. The system of claim 18 wherein the processing circuitry is configured to demodulate the identified response values to remove fast phase variations prior to the determination of the final response values.

28. The system of claim 18 wherein the antenna array is configured to move to provide the transmit and receive antennas at the different positions.

29. The system of claim 18 wherein the antenna array comprises a plurality of antenna sub-arrays comprising the transmit and receive antennas at the different positions.

30. The system of claim 18 wherein the scan path is fixed.

31. The system of claim 30 wherein the scan path is cylindrical.

* * * * *